(12) United States Patent
Na et al.

(10) Patent No.: US 8,281,808 B2
(45) Date of Patent: Oct. 9, 2012

(54) COOLANT RESERVOIR TANK FOR FUEL CELL VEHICLE

(75) Inventors: Sung Wook Na, Gyeonggi-do (KR); Su Dong Han, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 1178 days.

(21) Appl. No.: 12/152,947

(22) Filed: May 19, 2008

(65) Prior Publication Data

US 2009/0151903 A1 Jun. 18, 2009

(30) Foreign Application Priority Data

Dec. 13, 2007 (KR) .................. 10-2007-0130091

(51) Int. Cl.
*E03B 11/00* (2006.01)
*E05C 19/14* (2006.01)

(52) U.S. Cl. .................. 137/592; 137/590; 292/247
(58) Field of Classification Search .................. 137/590, 137/592; 292/247
See application file for complete search history.

(56) References Cited

U.S. PATENT DOCUMENTS

| | | | | |
|---|---|---|---|---|
| 3,043,616 A | * | 7/1962 | Magnuson | 292/3 |
| 3,319,834 A | * | 5/1967 | Steele | 222/146.2 |
| 3,775,951 A | * | 12/1973 | Eichholz et al. | 55/417 |
| 4,699,540 A | * | 10/1987 | Gibbon et al. | 404/49 |
| 6,843,285 B2 | * | 1/2005 | Ozawa | 141/326 |
| 2006/0085900 A1 | * | 4/2006 | Sigler et al. | 4/321 |

FOREIGN PATENT DOCUMENTS

| | | |
|---|---|---|
| JP | 07-270011 | 10/1995 |
| JP | 08-109826 | 4/1996 |

* cited by examiner

*Primary Examiner* — Craig Schneider
*Assistant Examiner* — Atif Chaudry
(74) *Attorney, Agent, or Firm* — Edwards Wildman Palmer LLP; Peter F. Corless (57) ABSTRACT

The present invention provides a coolant reservoir tank for a fuel cell vehicle, in which the coolant reservoir tank is positioned at a bottom of the vehicle such that coolant in a coolant line is collected in the reservoir tank by gravity during shutdown of a fuel cell system and the coolant in the reservoir tank is supplied to the coolant line by a vacuum pump during startup of the fuel cell system.

For this purpose, the present invention provides a coolant reservoir tank including: a coolant reservoir tank for a fuel cell vehicle, the coolant reservoir tank comprising: a reservoir housing having a predetermined volume of space; a cover for covering the top of the reservoir housing; and a plurality of ports detachably provided on at least one portion of the cover, wherein the reservoir housing and the cover are connected by a hinge type fastening member.

5 Claims, 7 Drawing Sheets

COOLANT RESERVOIR TANK FOR FUEL CELL VEHICLE

CROSS-REFERENCE TO RELATED APPLICATION

This application claims under 35 U.S.C. §119(a) the benefit of Korean Patent Application No. 10-2007-0130091 filed Dec. 13, 2007, the entire contents of which are incorporated herein by reference.

BACKGROUND (a) Technical Field

The present invention relates to a coolant reservoir tank for a fuel cell vehicle. More particularly, the present invention relates to a coolant reservoir tank for a fuel cell vehicle, which is positioned at a bottom of the vehicle such that coolant in a coolant line is collected to the reservoir tank by gravity when a fuel cell system is inactivated and the coolant in the reservoir tank is supplied to the coolant line by a vacuum pump during startup of the fuel cell system.

(b) Background Art

A fuel cell system generates electricity by converting chemical energy of fuel directly into electric energy. The fuel cell system generally comprises a fuel cell stack for generating electricity, a fuel supply system for supplying fuel (hydrogen) to the fuel cell stack, an air supply system for supplying oxygen in air, which is an oxidizing agent required for an electrochemical reaction, to the fuel cell stack, and a thermal and water management system for dissipating reaction heat of the fuel cell stack to the outside of the fuel cell system and controlling the operation temperature of the fuel cell stack.

The fuel cell system having the above configuration generates electricity by the electrochemical reaction of hydrogen as fuel and oxygen and exhausts heat and water as reaction by-products. Since in the fuel cell system, heat is concurrently generated with electricity during reaction, it is necessary to equip a means for cooling the fuel cell to prevent excessive increase of temperature in the fuel cell.

Figure 1:
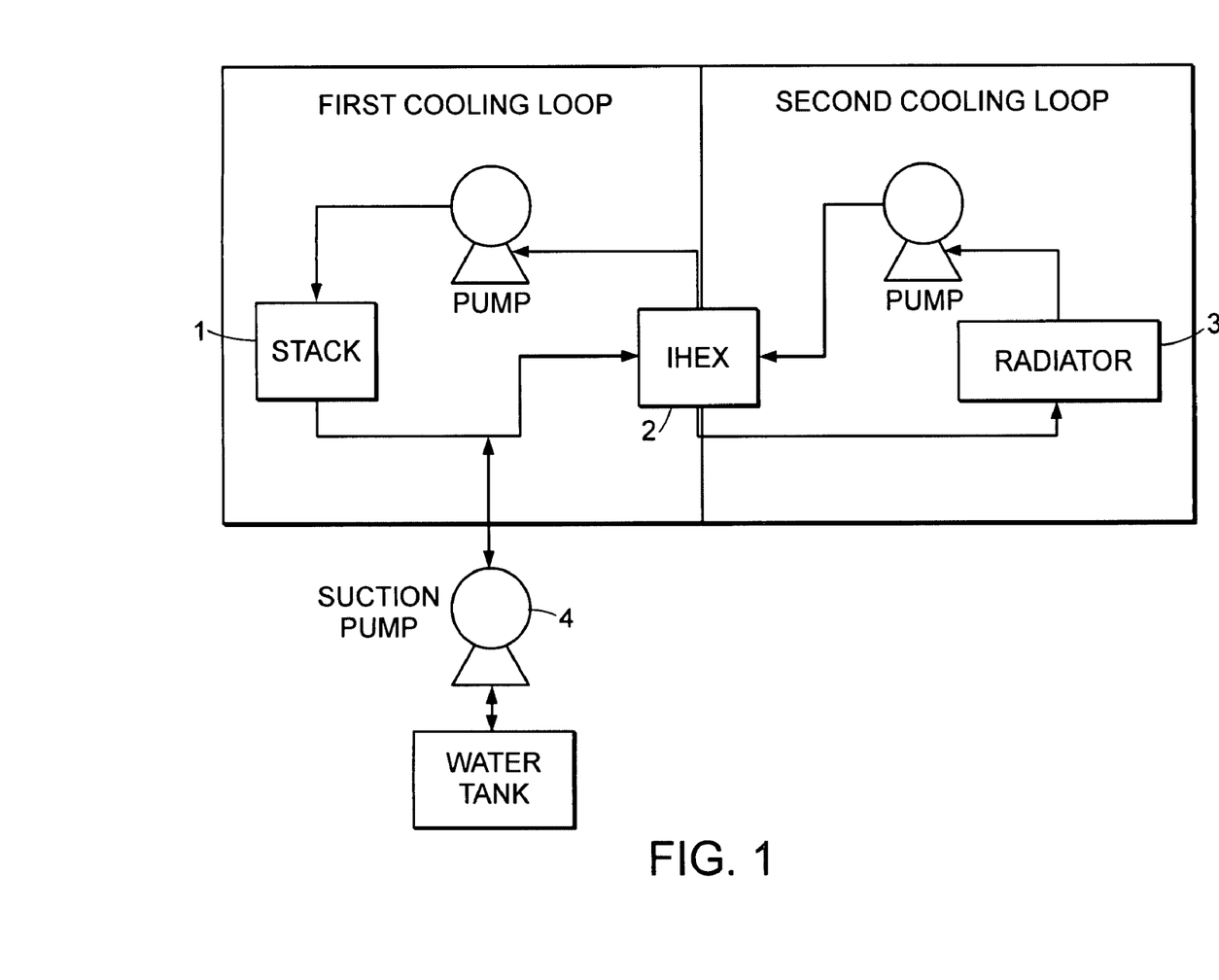
FIG. 1 is a conceptual diagram showing a conventional cooling system for a fuel cell vehicle.

FIG. 1 is a conceptual diagram showing a conventional cooling system for a fuel cell vehicle. An intermediate heat exchanger 2 is used to cool a fuel cell stack 1, in which, when a first coolant absorbs heat of the stack 1 and transfers the heat to a second coolant in the intermediate heat exchanger 2, the second coolant is cooled in a radiator 3 to radiate heat.

In such a first cooling loop adapted for primarily cooling the stack 1, when the fuel cell system is inactivated, all coolant in the loop flows down to a coolant reservoir tank (water tank) provided beneath the fuel cell system, i.e., at the lowest portion of the vehicle due to gravity. On the other hand, during startup of the fuel cell system, when a vacuum state is created in the fuel cell system by a vacuum pump 4, the coolant in the reservoir tank returns to the inside of the fuel cell system by a pressure difference.

Such a coolant reservoir tank having the above function is necessary to both satisfy the sealing requirements of connection portions and ensure a high coolant supply capability in a vacuum state.

Figure 2:
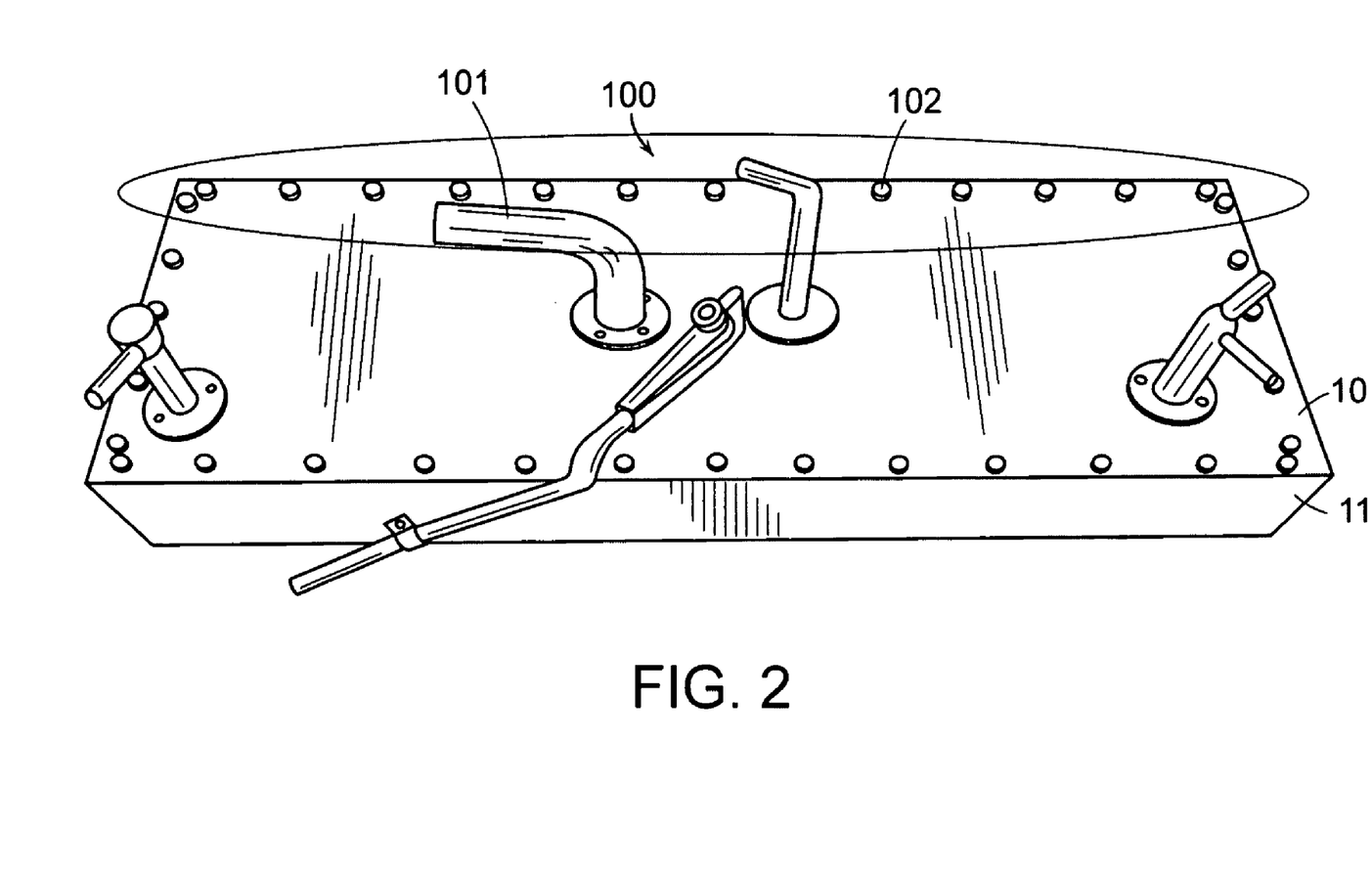
FIG. 2 is a diagram showing a connecting state between a cover and a reservoir housing of a conventional reservoir tank.

As shown in FIG. 2, in a conventional reservoir tank 100 for a fuel cell vehicle, a reservoir housing 11 and a cover 10 are joined together by means of bolts 102, the cover and a port 101 are also connected by the bolts 102, and a silicon pad 103 is mounted on the connection portions to maintain the air tightness.

Figure 3:
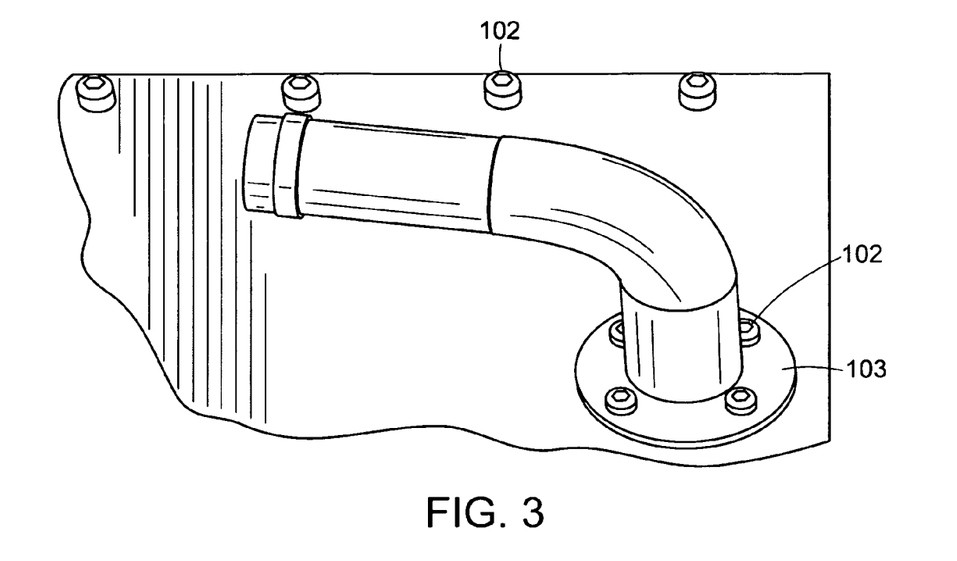
FIG. 3 is a diagram showing a connection portion of a conventional outlet port.

However, the above-described structure has some drawbacks in that the assembling efficiency is deteriorated due to the large number of bolts 102 (approximately 80). Moreover, since the silicon pads 103 and 104 (shown in FIGS. 3 and 4) mounted between the reservoir housing 11 and the cover 10 and on the connection portion of the port 101 may be deformed by the fastening pressure caused when the bolts 102 are fastened, the air tightness is not maintained, causing a coolant leakage.

Moreover, during the startup of the fuel cell system, the vacuum state is not maintained in the system by the leakage of the connection portions, and thus the coolant may not be smoothly supplied to the system.

Figure 4:
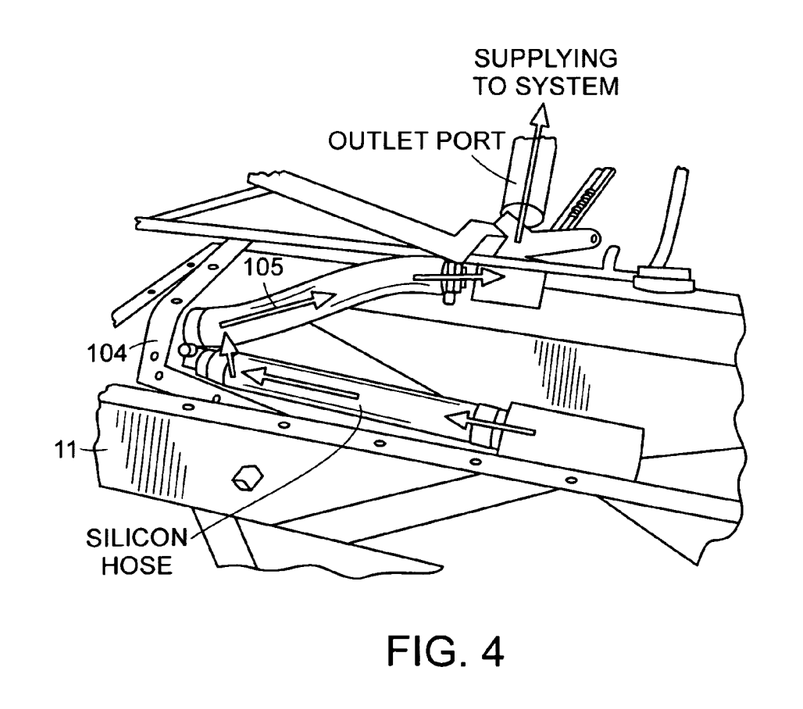
FIG. 4 is a diagram showing an internal structure of the conventional reservoir tank.

Furthermore, as shown in FIG. 4, a pipe 105 having a " ⊂ " shape provided in the reservoir housing 11, although it can suck the coolant at the bottom of the reservoir tank to enable coolant supply even if the vehicle is inclined on a slope, may cause a pressure drop, which prevents a smooth coolant supply even if the inside of the fuel cell system is under a vacuum condition.

The information disclosed in this Background section is only for enhancement of understanding of the background of the invention and should not be taken as an acknowledgement or any form of suggestion that this information forms the prior art that is already known to a person in the art.

SUMMARY OF THE DISCLOSURE

The present invention has been made in an effort to solve at least the above-described problems associated with prior art.

In one aspect, the present invention provides a coolant reservoir tank for a fuel cell vehicle, the coolant reservoir tank comprising: a reservoir housing having a predetermined volume of space; a cover for covering the top of the reservoir housing; and a plurality of ports detachably provided on at least one portion of the cover, wherein the reservoir housing and the cover are connected by a hinge type fastening member.

Preferably, the hinge type fastening member may include a ring portion and a body. A top portion of the ring portion is in the form of a hook. A top portion of the body is hingedly connected to a portion of the outer surface of the reservoir housing such that a bottom portion thereof can be rotated upwardly and downwardly. In this case, the cover is provided on a plurality of edges thereof with a locking groove in the form of "L"so that the ring portion of the fastening member can be locked thereto.

Preferably, a cured silicon rubber is attached on the circumferential surface of the top portion of the reservoir housing to maintain air tightness between the cover and the reservoir housing.

Also preferably, the coolant reservoir tank may further comprise: a cap nut connected to a bottom portion of each of the ports; and at least one screw-type tube formed integrally with and protruding from a portion of the top surface of the cover and having a screw thread on the outer circumferential surface thereof. In this case, each of the ports is connected to the cover by connection between the cap nut and the screw-type tube. In this case, an O-ring may further be provided on a top portion of the screw-type tube to maintain air tightness between each of the ports and the cover.

Also suitably, the bottom surface of the reservoir housing is inclined toward the center of the bottom of the reservoir housing, a straight pipe is provided to extend vertically from the center, and a top portion of the straight pipe is to be inserted into one of the screw-type tubes provided on the cover such that coolant stored in the reservoir housing is introduced through a bottom portion of the straight pipe and moved upward by a pressure difference caused by a vacuum applied in a fuel cell. In this case, an O-ring may further be mounted on a top portion of the straight pipe to maintain air tightness between the pipe and the screw-type tube.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Reference numerals set forth in the Drawings includes reference to the following elements as further discussed below:

| 10: cover | 11: reservoir housing |
| 12: fastening member | 12a: ring portion |
| 12b: body | 12c: button |
| 12d: spring | 13 and 13': inlet port |
| 14: outlet port | 15: cured silicon rubber |
| 16: cap nut | 17 and 20: O-rings |
| 18: screw-type tube | 19: straight pipe |
| 21: channel | |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

Figure 5:
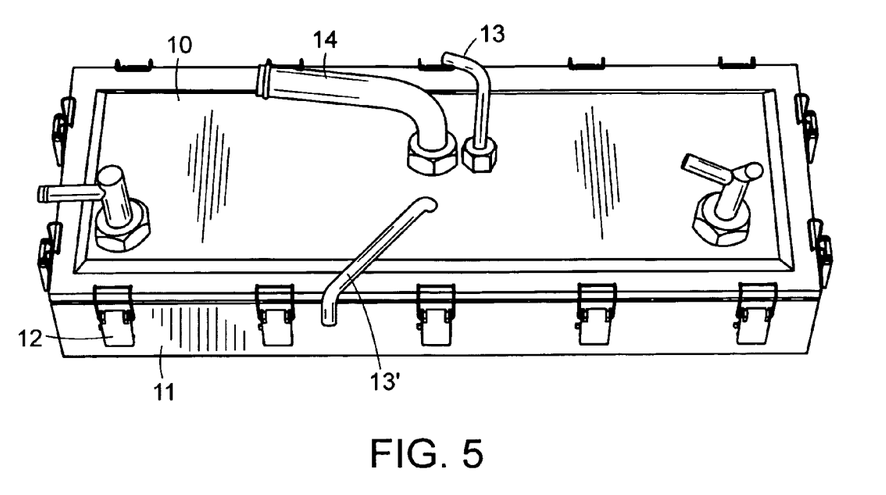
FIG. 5 is a diagram showing a coolant reservoir tank in accordance with a preferred embodiment of the present invention.
Figure 6:
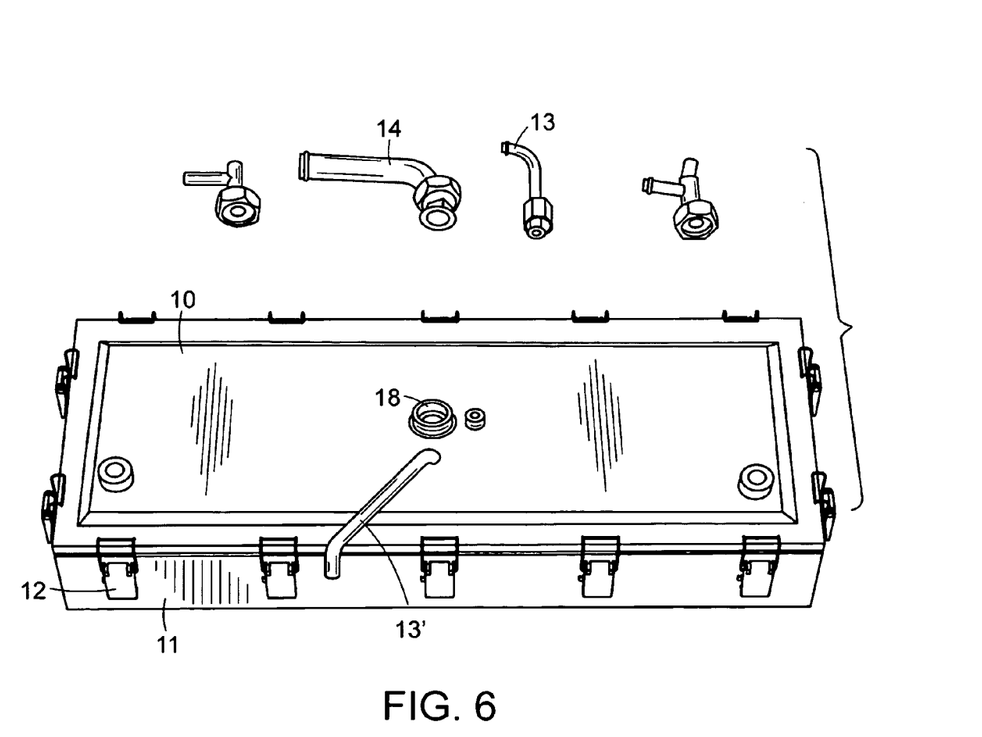
FIG. 6 is a diagram showing a state before various ports of the coolant reservoir tank of FIG. 5 are connected.
Figure 7:
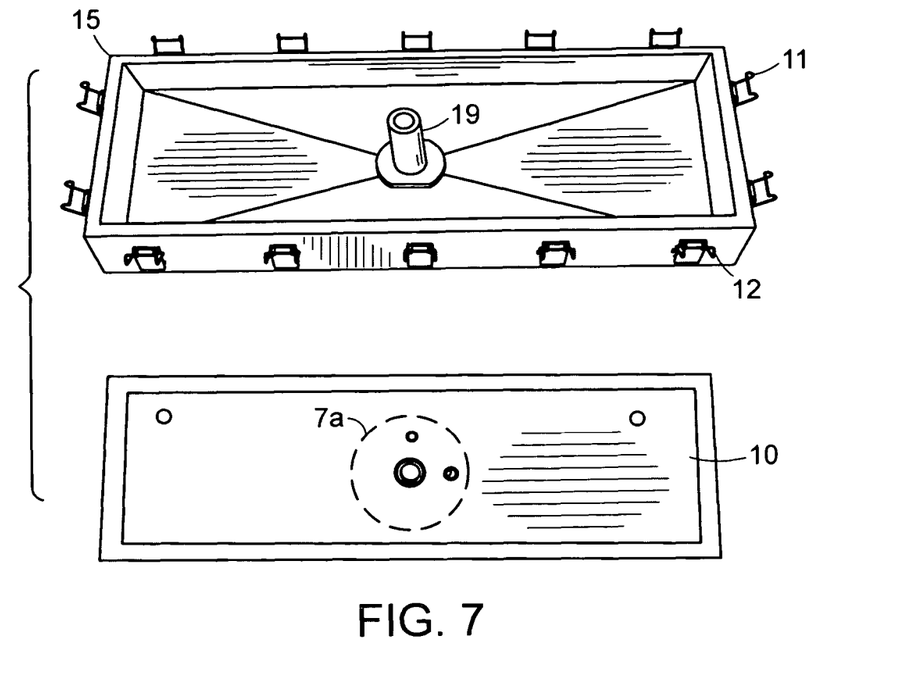
FIG. 7 is a diagram showing an internal structure of the coolant reservoir tank of FIG. 5.
Figure 7A:
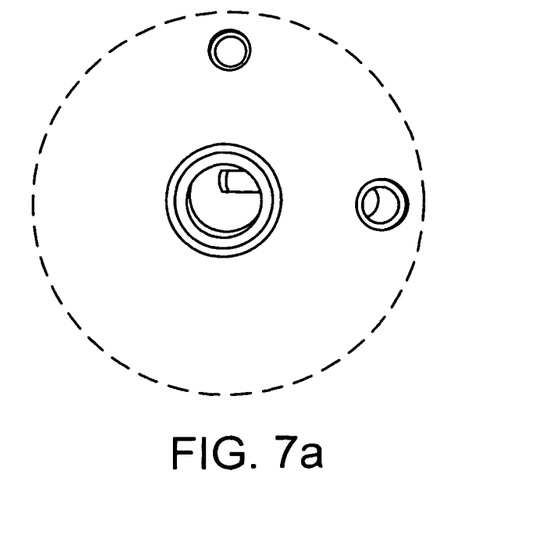
Figure 8:
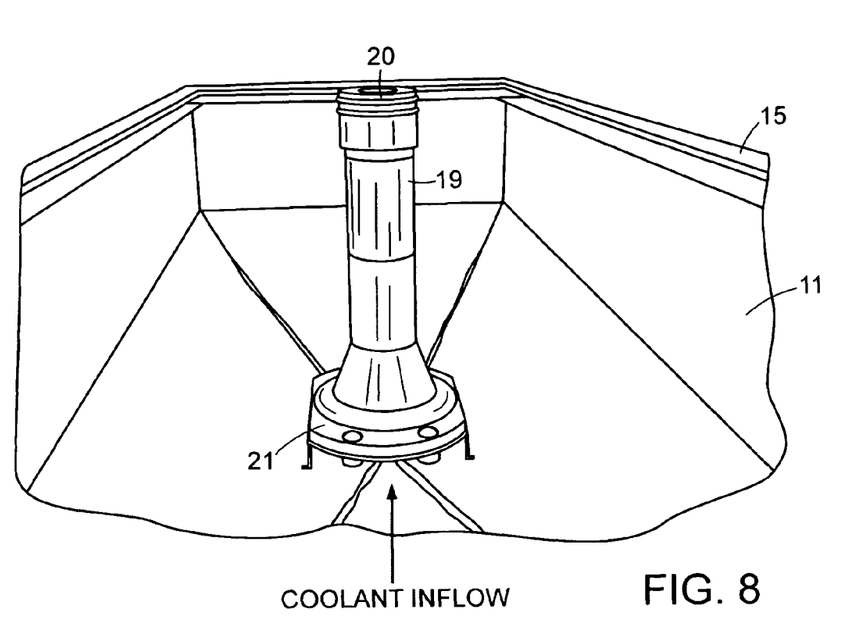
FIG. 8 is a diagram showing a bottom portion of the internal structure of FIG. 7.
Figure 9:
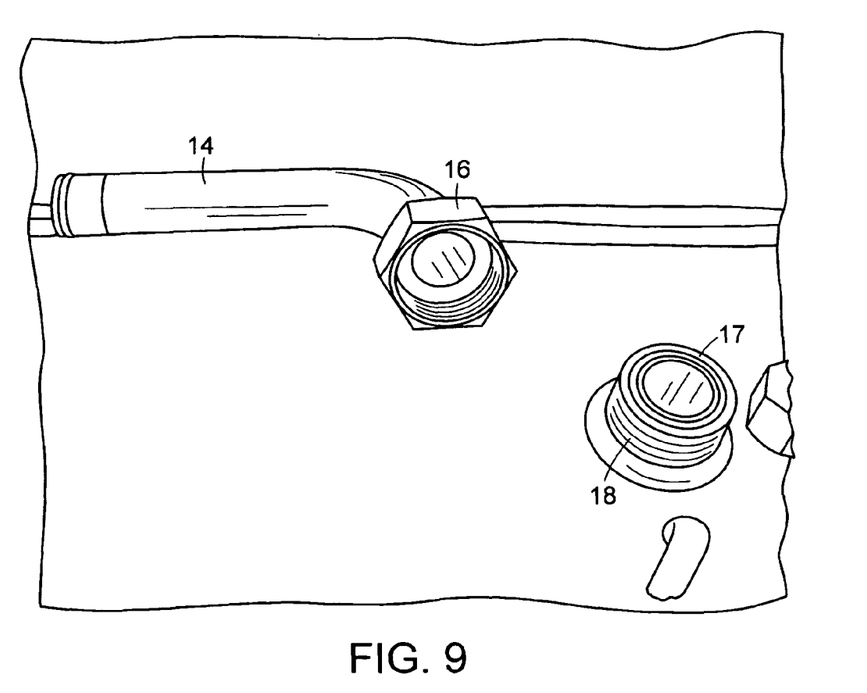
FIG. 9 is an exploded view of an outlet port and a screw-type tube of the coolant reservoir tank of FIG. 5.
Figure 10:
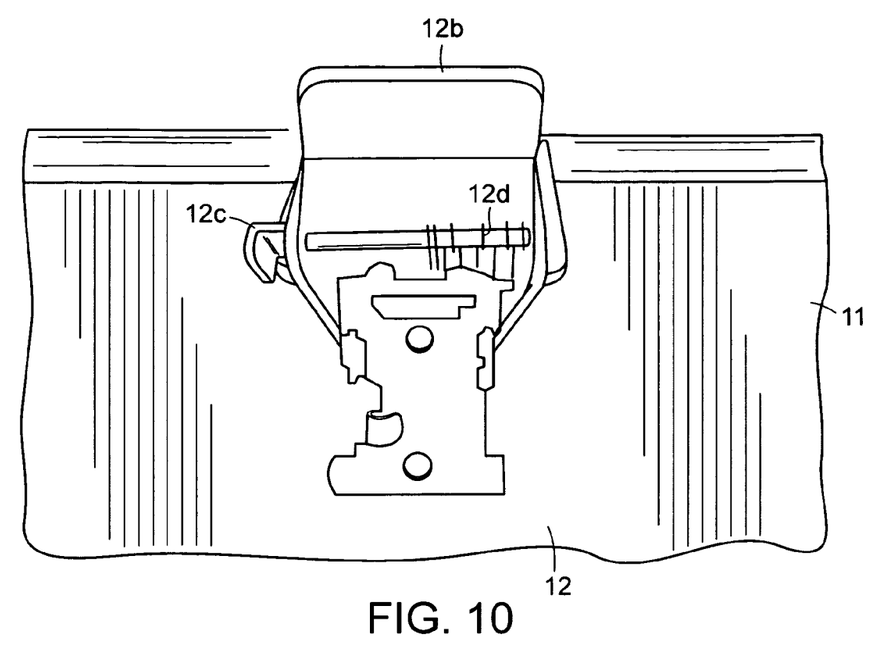
FIG. 10 is a diagram showing a portion of the coolant reservoir tank of FIG. 5 before a fastening member is fastened.
Figure 11:
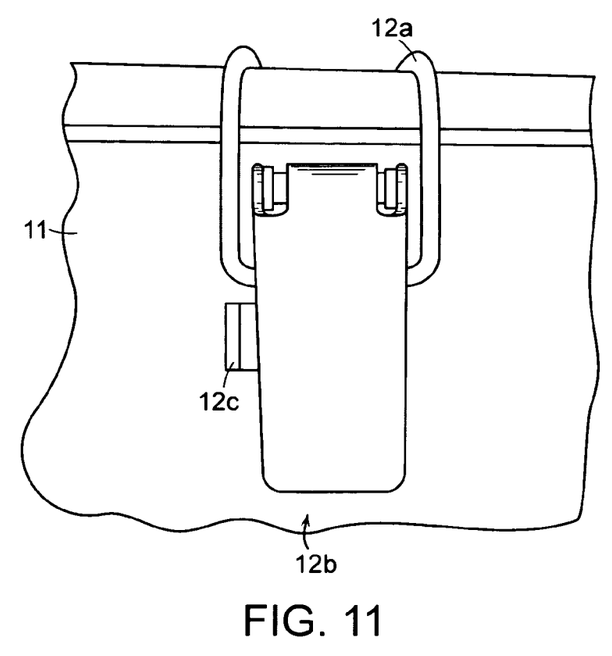
FIG. 11 is a diagram showing a portion of the coolant reservoir tank of FIG. 5 after the fastening member is fastened.

FIG. 5 is a diagram showing a coolant reservoir tank in accordance with a preferred embodiment of the present invention; FIG. 6 is a diagram showing a state before various ports of the coolant reservoir tank of FIG. 5 are connected; FIG. 7 is a diagram showing an internal structure of the coolant reservoir tank of FIG. 5; FIG. 8 is a diagram showing a bottom portion of the internal structure of FIG. 7; FIG. 9 is an exploded view of an outlet port and a screw-type tube of the coolant reservoir tank of FIG. 5; FIG. 10 is a diagram showing a portion of the coolant reservoir tank of FIG. 5 before a fastening member is fastened; and FIG. 11 is a diagram showing a portion of the coolant reservoir tank of FIG. 5 after the fastening member is fastened.

In a preferred embodiment of the present invention, a spring type fastening member 12 is mounted on a reservoir housing 11 instead of a fastening bolt in order to prevent the assembly defect as described above.

According to a preferred embodiment, the coolant reservoir tank includes the reservoir housing 11 having a predetermined volume of storage space for storing coolant, and a cover 10 for covering a top portion of the reservoir housing 11.

Inlet and outlet ports 13 and 14 to be connected to a coolant line of a fuel cell are attached on the cover 10. As shown in FIG. 5, the port at the center of the cover 10 is the outlet port 14 and the other ports are the inlet ports 13. That is, the coolant is introduced from the fuel cell to the reservoir housing 11 through the inlet ports 13. One port 13' among the inlet ports 13 is a port for discharging excessive water generated in the fuel cell.

As shown in FIGS. 10 and 11, the fastening member 12 includes a ring portion 12a, of which the top portion is in the form of a hook, and a body 12b, of which the top portion is hinge-connected to the outer surface of the reservoir housing 11 such that the bottom portion thereof is rotated in the up and down direction. A locking groove in the form of "L" is provided on the edge of the cover 10 so that the ring portion 12a of the fastening member 12 is locked thereto. Moreover, a button 12C is provided on the lateral side of the body 12b such that the ring portion 12a locked on the locking groove can be released by pushing the button 12C.

With the use of the fastening member 12 having the above-described structure, it is possible to significantly reduce the number of fastening bolts, simplify the assembly process, facilitate the maintenance and repair while maintaining the fastening pressure at least the same as the conventional fastening bolts.

Moreover, a cured silicon rubber 15 is applied to the connection portion between the cover 10 and the reservoir housing 11 in order to maintain the air tightness without deformation caused by the fastening pressure of the fastening member 12.

Furthermore, a cap nut 16 and an O-ring 17 are connected to the port connection portion instead of silicon pads in order to solve the leakage problem associated with prior art and simplify the structure, thus improving the assembling efficiency.

In more detail, the cap nut 16 is detachably attached to the bottom portion of the outlet port 14, a female screw portion is provided on the inner circumferential surface of the cap nut 16, and a screw-type tube 18 is formed on the top surface of the cover 10 integrally therewith.

A male screw thread is formed on the outer circumferential surface of the screw-type tube 18 to be connected to the female screw portion of the cap nut 16 such that the outlet port 14 may be detachably attached, thus improving the assembling efficiency. Moreover, the O-ring 17 is mounted on the top portion of the screw-type tube 18 to maintain the air tightness between the outlet port 14 and the screw-type tube 18.

Conventionally, the coolant is supplied from the inside of the reservoir housing to a fuel cell system via a pipe having a "⊂" shape (FIG. 4); in contrast, a straight pipe 19 extending from the center of the bottom of the reservoir housing 11 is provided in the present invention (FIG. 8).

As shown in FIG. 8, an O-ring 20 is mounted on the top portion of the straight pipe 19. When the cover 10 closes the top portion of the reservoir housing 11, the top portion of the pipe 19 is inserted into the screw-type tube 18 of the cover 10. At this time, the O-ring 20 can significantly reduce the pressure drop while maintaining the air tightness.

Moreover, a channel 21 is provided on the bottom portion of the straight pipe 19 to be connected to the inside of the pipe, and the bottom surface of the reservoir housing 11 is inclined toward the center thereof such that the coolant stored in the reservoir housing 11 can be moved upward via the channel 21.

As seen from the following Table 1, the coolant supply capability is significantly improved; the flow rate of the present invention was 53.43 LPM while the flow rate of the conventional product was 47.04 LPM.

Furthermore, the available space for storing the coolant is increased due to the simplification of the internal parts with respect to the same volume of the conventional product, and thus the startability on a slope was is significantly improved.

As described above, the coolant reservoir tanks for a fuel cell vehicle according to the present invention have advantages including the following:

First, since the cover and the reservoir housing are connected by the spring-type fastening member instead of the conventional fastening bolt, the workability and assembly efficiency are improved and the ring portion of the fastening member can be prevented from being released by vibration during the driving of the vehicle.

Moreover, since the cured silicon rubber is used instead of the conventional silicon pad mounted on the connection portion between the reservoir housing and the cover, and the cap nut and the O-ring are used instead of the conventional silicon pad, sufficient air tightness is obtained.

Furthermore, since the conventional pipe having a "⊂" shape is modified into the straight pipe, the overall structure is simplified and the assembling efficiency is improved.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A coolant reservoir tank for a fuel cell vehicle, the coolant reservoir tank comprising:
    a reservoir housing having a predetermined volume of space;
    a cover for covering the top of the reservoir housing; and
    a plurality of ports detachably provided on at least one portion of the cover,
    wherein the reservoir housing and the cover are connected by a hinge type fastening member,
    a cap nut connected to a bottom portion of each of the ports; and
    at least one screw-type tube formed integrally with and protruding from a portion of the top surface of the cover and having a screw thread on the outer circumferential surface thereof, wherein each of the ports is connected to the cover by connection between the cap nut and the screw-type tube;
    wherein the hinge type fastening member includes a ring portion, a top portion of which is in the form of a hook, and a body, a top portion of which is hinge-connected to a portion of the outer surface of the reservoir housing such that a bottom portion thereof can be rotated upwardly and downwardly, and
    the cover is provided on a plurality of edges thereof with a locking groove in the form of "L" so that the ring portion of the fastening member can be locked thereto,
    wherein the bottom surface of the reservoir housing is inclined toward the center of the bottom of the reservoir housing, a straight pipe is provided to extend vertically from the center, and a top portion of the straight pipe is to be inserted into one of the screw-type tubes provided on the cover such that coolant stored in the reservoir housing is introduced through a bottom portion of the straight pipe and moved upward by a pressure difference caused by a vacuum applied in a fuel cell.

2. The coolant reservoir tank of claim 1, wherein a cured silicon rubber is attached on the circumferential surface of the top portion of the reservoir housing to maintain air tightness between the cover and the reservoir housing.

3. The coolant reservoir tank of claim 1, wherein an O-ring is provided on a top portion of the screw-type tube to maintain air tightness between each of the ports and the cover.

4. The coolant reservoir tank of claim 1, wherein an O-ring is mounted on a top portion of the straight pipe to maintain air tightness between the pipe and the screw-type tube.

5. A fuel cell vehicle comprising the coolant reservoir tank of claim 1.

* * * * *